United States Patent [19]
Haberle

[11] 3,863,326
[45] Feb. 4, 1975

[54] DEVICE FOR MANUFACTURING DOUBLE-WALLED CUPS

[76] Inventor: Wilhelm Haberle, Industriegelande, Scheer/Wurttemberg, Germany

[22] Filed: Jan. 18, 1973

[21] Appl. No.: 324,782

[30] Foreign Application Priority Data
Jan. 20, 1972 Germany............................ 2202624

[52] U.S. Cl................... 29/208 F, 29/429, 29/453, 29/455, 215/13 R, 425/347, 425/398, 425/436
[51] Int. Cl........................................... B23p 19/04
[58] Field of Search... 29/455, 208 R, 208 E, 208 F, 29/451, 453, 429; 264/152; 425/398 X, 436 X, 347 X; 215/13 R

[56] References Cited
UNITED STATES PATENTS

| | | | |
|---|---|---|---|
| 2,715,326 | 8/1955 | Gits.................................. | 215/13 R |
| 3,013,308 | 12/1961 | Armour............................... | 29/451 |
| 3,336,654 | 8/1967 | Ryan.................................. | 29/429 |
| 3,392,223 | 7/1968 | Thiel................................. | 264/152 |
| 3,427,704 | 2/1969 | Banke........................ | 29/208 R X |
| 3,570,064 | 3/1971 | De Groot............................. | 425/347 |

Primary Examiner—Charlie T. Moon
Attorney, Agent, or Firm—Ernest F. Marmorek

[57] ABSTRACT

A process and device for manufacturing double-walled cups by a single machine. A molding machine molds both inner and outer cups which are then put one into the other so as to join them. There is no necessity to flange or edge the cups to interconnect them. Accordingly, the double-walled cups may be manufactured inexpensively with a minimum of human labor.

8 Claims, 3 Drawing Figures

DEVICE FOR MANUFACTURING DOUBLE-WALLED CUPS

BACKGROUND OF THE INVENTION

This invention relates to a process and an apparatus for manufacturing double-walled cups such as drinking cups or packing cups which are composed of thermoplastically deformable synthetic foils or sheets.

It is already known to make cups consisting of an outer and an inner cup. The purpose of such double-walled cups is to avoid the intolerable heating of a drinking cup filled, for example, with tea, coffee or other hot liquids. In this case the individual components of the cup are separated from each other by intersticial spaces. Accordingly, the enclosed air space prevents a rapid heat transfer from the outer cup to the inner cup, that is, thermal insulation.

The manufacture of such two-part cups has required the expenditure of considerable work and time. Accordingly, the cups could not be manufactured inexpensively and therefore the application was limited. The two parts of the cup were manufactured according to the known process by separate molding machines by a deep drawing process. Thereafter, they have to be joined by hand or a separate transport device must be employed and finally the cups must be put one into the other. Furthermore, the borders of the cups must be flanged or edged in special flanging devices in order to connect the inner cup to the outer cup. This frequently causes damage to the cups and due to the increased scrap causes a rise of the manufacturing costs.

It is accordingly an object of the invention to provide a process and a device for the manufacture of double-walled cups consisting of an inner and an outer cup which avoids the disadvantages of the known manufacturing processes.

Another object of the invention is to provide a process and apparatus of the type described which permits to put into each other automatically the component parts of the cups immediately after they have been formed by the molding machine without requiring additional labor which enables a rapid and inexpensive manufacture of cups without flanging devices and which practically eliminates damage of the cups.

SUMMARY OF THE INVENTION

In accordance with the present invention there is provided a process for manufacturing cups which is characterized in that the molding station of the machine manufactures simultaneously both outer and inner cups. Subsequently, the cups are ejected into a removal device by means of which an inner cup is fed into an outer cup or an outer cup is fed into an inner cup preferably at the same cycle as that of the molding machine. Finally, the two cups are pressed into each other.

The device for performing this process is suitably so arranged that the molding station of the machine is provided with tools for the simultaneous manufacture of inner and outer cups. Furthermore, a removal device is associated with the molding station so that the inner cups and the outer cups can be ejected into the removal device and whereby an inner cup is pressed into an outer cup or an outer cup into an inner cup preferably in synchronism with the working cycle of the molding machine.

The removal device suitably is formed of one or several rotatably journaled, and drivable disks. The disks are provided with inserts for receiving the inner or outer cups. It is also convenient to provide the inserts with one or several stops for keeping or holding the inner or outer cups.

In order to drive the disks a chain drive is suitably provided. By means of the chain drive, the individual disks are drivably interconnected and are connected with the drive means of the molding machine or with a separate drive motor preferably a synchronous motor. It is also possible, however, to provide the disks with meshing outer teeth or similar devices whereby one of the disks is in driving connection with the driving means of the molding machine or with a separate drive motor.

It is further very suitable to provide the removal device with holding devices for storing the cups which are put one into the other. These holding devices may be formed by one or several disks which are rotatably journaled in a frame and which are disposed opposite the disks of the removal device. Between the disks of the holding device there may be provided keepers in the form of tension wires or the like. In order to secure a safe connection between inner and outer cups it is further suitable to provide the cups with one or several outwardly or inwardly extending bends by means of which the cup portions may be interlocked.

The process of the invention for manufacturing doubled-walled cups or the device for applying this process makes it not only possible to manufacture inexpensively and rapidly in a simple manner such double-walled cups, but also substantially avoids damage of the cup portions or the finished cups. Since in the molding station of the machine the inner and outer cups are made simultaneously they are fed into a removal device where an inner cup is pressed into an outer cup or an outer cup into an inner cup. It is possible to manufacture automatically the cups immediately behind the molding machine and at the same working cycle without requiring any human labor. The portions of the cups are put one into the other by swinging of the removal device. For example, two inserts may be provided in one disk so that swinging through an angle of only 180° is necessary. Accordingly, the cup portions may be disposed as follows: inner cup - outer cup, inner cup - outer cup and then put one into the other in order to make a double-walled cup. The expenditure of machinery and labor required to carry out the process is very small.

Furthermore, damage of the portions of the cups during the putting together of the two cups is almost impossible because the edging of the cup rims which was necessary for the known process is not required. The portions of the finished cup are only put one into the other in accordance with the process of the invention or the device for applying this process within the inserts of the removal device. Accordingly, an additional transport and the resulting expense is not necessary. The joining of the portions of the cup is further facilitated because the cup portions are still warm. By means of the process and device of the invention it is accordingly possible to manufacture such double-walled cups in a simple manner and inexpensively; further the cups have exactly the desired form.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
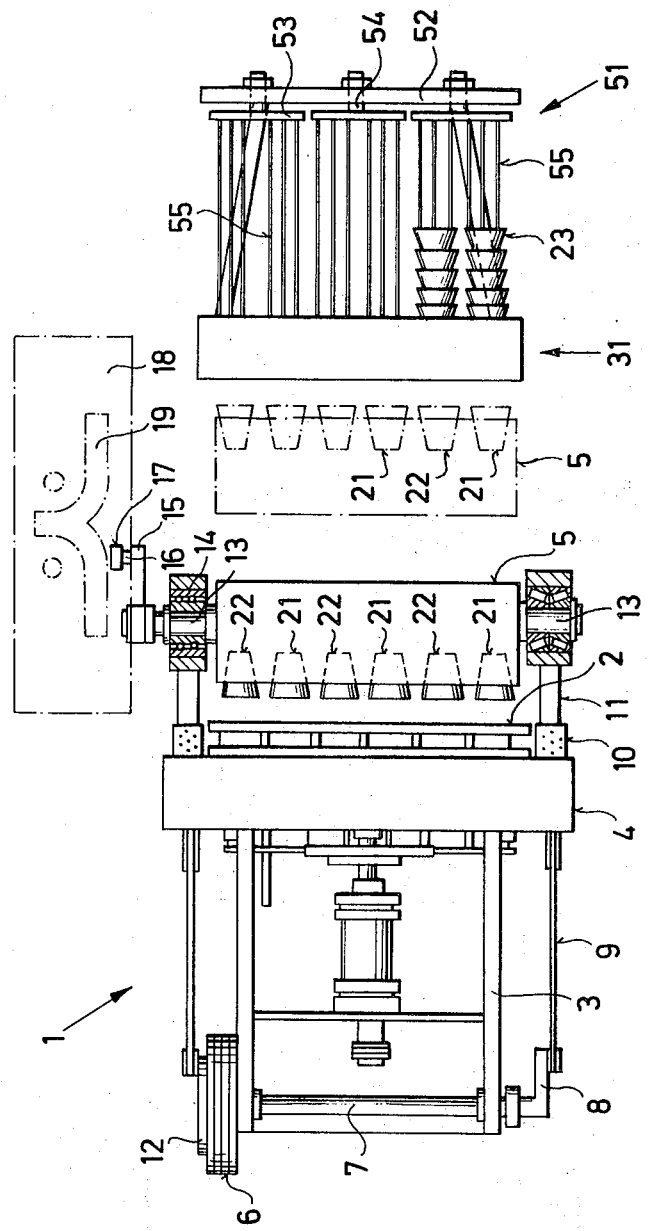
FIG. 1 is a schematic top plan view of the deep drawing machine with a following removal device embodying the present invention.

The machine 1 illustrated in FIG. 1 serves the purpose to manufacture cups 23 consisting of a thermoplastically deformable foil or sheet material 2. The machine consists essentially of a molding unit 4 disposed in the machine frame 3 and a punching unit 5. In order to drive the punching unit 5 there is provided a motor, not illustrated, which is in driving connection by means of a cone belt 6 with a shaft 7. From the shaft 7 the driving energy is applied to the punching unit 5 by means of two cranks 8 secured to the two ends of the shaft 7 and which are connected by crank rods 9 with guide rails 11 which are slidably journaled in ball bushing 10. In order to drive the shaft 7 in a controlled intermittant manner in accordance with the desired working cycle, there is provided on the shaft a swingable coupling 12 by means of which a connection of the cone belt disk 6 with the shaft 7 may be accomplished.

The molding unit 4 and the punching unit 5 manufacture hollow bodies from the thermoplastic material 2. These hollow bodies must be fed to the removal device 31 following the machine 1 or to the holder devices 51 thereof which accept the finshed cups. Accordingly, to this end the punching unit 5 is journaled to be capable of swinging through 180°. To this end the punching unit 5 is provided with two shaft pivots 13 which are rotatably journaled in bushings 14 of the guide rail 11. Furthermore, a lever 15 is provided on the pivot 13 having a guide bolt 16 provided with a roller 17 which engages a control curve or cam 19 provided in a plate 18. During an axial movement of the punching unit 5 the latter is rotated about pivot 13 by the lever 15 which is forced to move along the control curve 19. Accordingly, its opening faces the removal device 31 so that the hollow bodies may be fed into the removal device.

In order to manufacture double-walled cups with the machine 1 the molding unit 4 and the punching unit 5 are provided with tools by means of which outer cups 21 and inner cups 22 may be formed. The two cups 21 and 22 are pressed against each other in a special manner in the removal device 31. The tools for manufacturing the outer and inner cups 21 and 22 are illustrated to be arranged adjacent to each other. However, it is also possible to dispose them one above the other in such a manner that the cup portions 21 and 22 may be ejected simultaneously from the punching unit 5 into the removal device 31.

Figure 3:
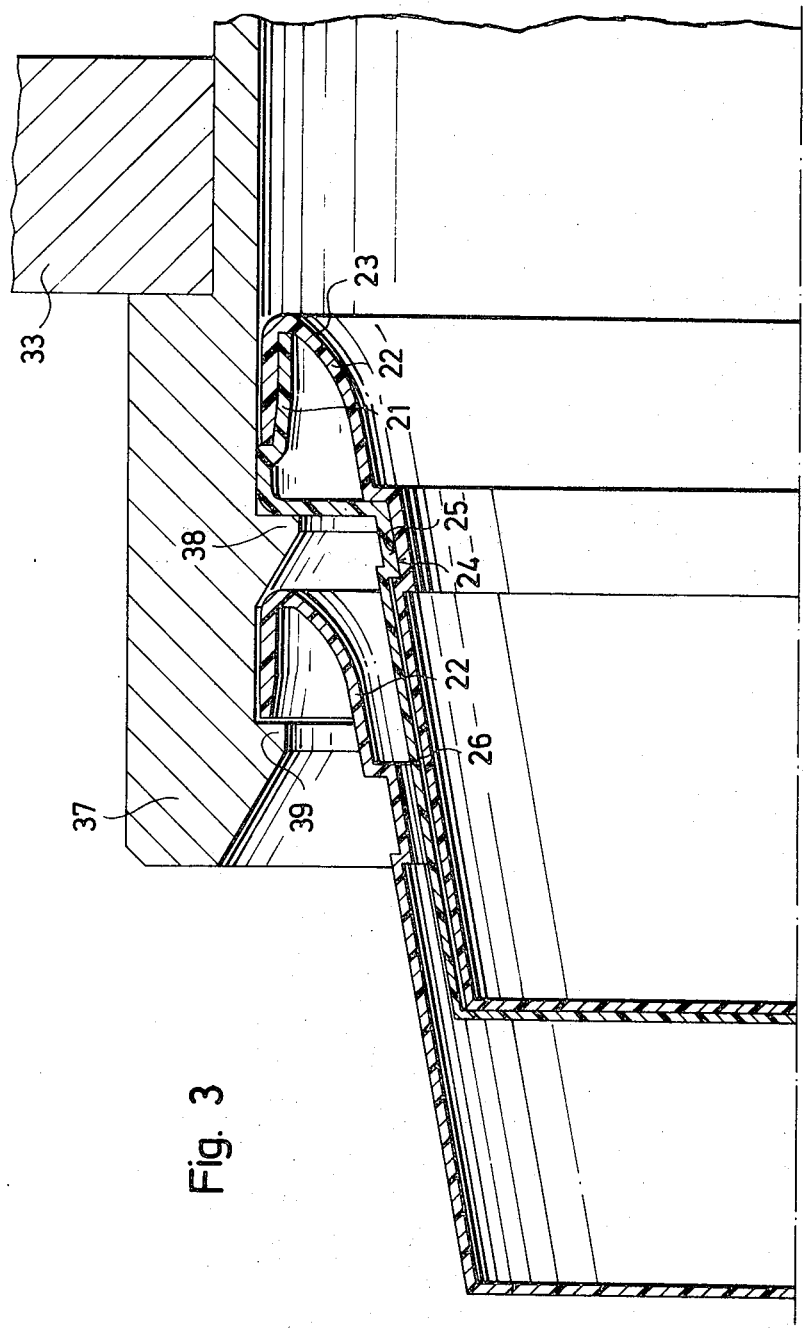
FIG. 3 is a cross-sectional view on enlarged scale of an insert of one of the disks of the removal device.

In order to put into each other the adjacent outer and inner cups 21 and 22 to form a double-walled cup 23, the removal device 31 is provided with several disks 33 which are rotatably mounted in the journaled plate 32 and which are drivably arranged. Inserts 37 are disposed in the disks 33 for accepting the outer and inner cups 21 and 22. These inserts 33, as shown in FIG. 3, are alternately fed an inner cup 22 and an outer cup 21. However, it will be understood that if the inserts are suitably modified the sequence can be reversed. In this manner a double-walled cup 23 is manufactured immediately after the outer cup 21 and the inner cup 22 are molded. Since the outer cup 21 is provided with an outwardly extending bend 24 and the inner cup 22 with an associated inwardly extending bend 25, the cup portions are interlocked when the inner cup 22 is inserted into the outer cup 21. Accordingly, the two cup portions are solidly connected to each other and are provided with a thermally isolating hollow space 26. Since the inserts 37 are provided with the stops 38 and 39 shown in exaggerated manner, the inner cup 22 is held in a particular position so that by means of the stop 39 the initially inserted inner cup 22 is safely received while the same is accomplished by the stop 38 for the outer cup 21. It is to be understood that additionally the rims of the cup portions may be edged over by a special flanging device in order to connect, for example, the outer cup 21 with the inner cup 22.

The disks 33 of the removal device 31 are to be rotated intermittantly through 180° so that for example an insert 37 bearing an inner cup 22 is disposed during the following working cycle in front of a punching tool from which an outer cup is ejected. Into the individual inserts 37 there is accordingly pressed in the example illustrated alternately an inner cup 22 and after rotation through 180° an outer cup 21 which together form a double-walled cup 23.

Figure 2:
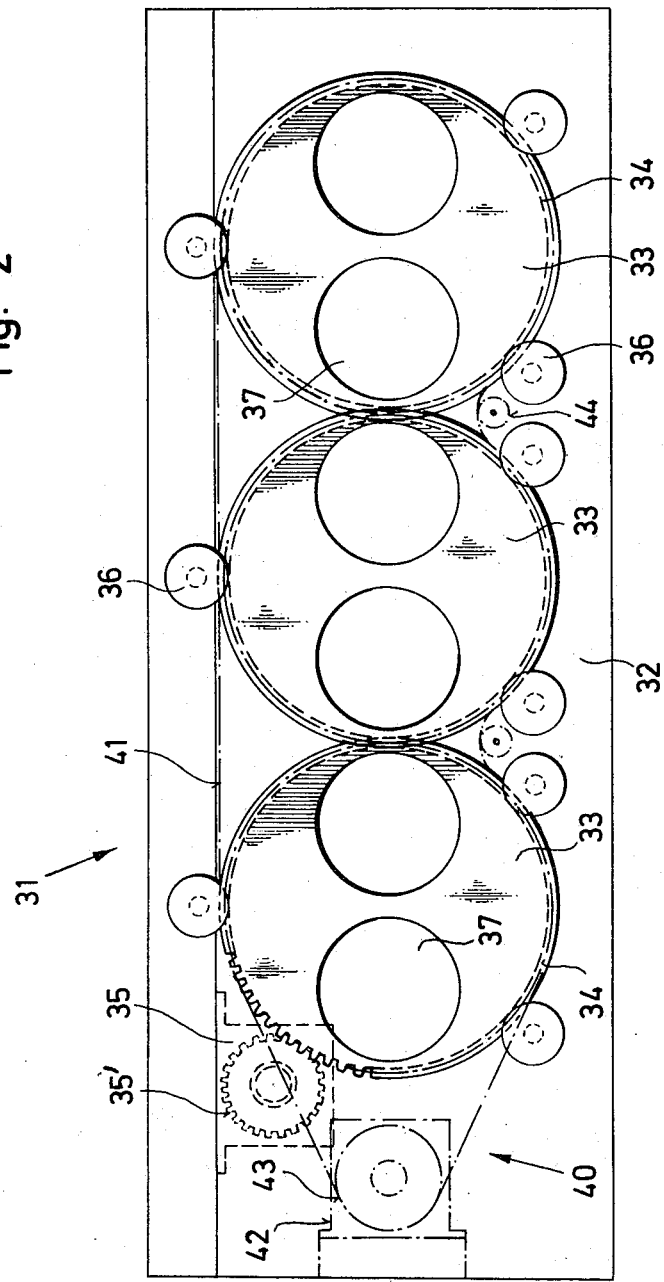
FIG. 2 is a side elevational view of the removal device formed by a plurality of disks.

In order to drive the disks 33 there may be provided as shown in FIG. 2 a drive motor 35 which is preferably a sychronous motor. The motor is in driving connection by means of a gear 35' with one of the disks 33 provided with outer teeth 34. It will be understood that it is also possible to connect the gear 35' with the drive elements of the machine 1. The drive of the disks 33 which are rotatably arranged by means of the rollers 36 may also be accomplished as shown in dashed lines by means of a drive motor 42 and a chain drive 40 consisting of the chain wheel 43, the chain 41 and the tensioning and reversal roller 44.

If the two cup portions 21, 22 are interlocked with each other the double-walled cup 33 formed in this manner is ejected during the introduction of the next inner cup 22 into an insert 37. According to FIG. 1, the ejection takes place onto the holder device 51 onto which the cups 23 are stacked automatically so that they may be readily removed.

The holder devices 51 consist each of disks 53 which are rotatably journaled by means of bolts 54 in a frame 52. The disks 53 are disposed opposite the disks 33 of the removal device 31 and may be rotated jointly therewith. In order to interconnect the disks to drive them and also to avoid that the cups 23 drop out during the rotation, but to insure that they can be readily removed, tension wires 55 are stretched between disks 33 and 53. By spreading the tension wires 54 apart during a pause between two operating cycles, stacks of the double-walled cups 23 may be removed from the machine 1.

I claim:

1. A device for manufacturing double-walled cups from thermoplastically deformable sheets, each cup being composed of an outer cup and an inner cup, said device comprising:

a. a molding station having tools for simultaneously manufacturing both outer and inner cups; and
b. a removal device associated with said molding station, means for ejecting the cups from said molding station into said removal device and by means of which an associated pair of inner and outer cups is fed by said molding station, said removal device being formed of at least one disk rotatably journaled and capable of being driven, and a plurality of inserts in each of said disks operable for receiving the outer or inner cups.

2. Device as defined in claim 1, wherein said inserts are provided with at least one stop for keeping one of said inner or outer cups.

3. Device as claimed in claim 1, wherein a chain drive is provided for driving said disks, each of said disks being drivably connected with said chain drive and being connected in turn with the drive elements of said machine.

4. Device as claimed in claim 1 wherein a chain drive is provided for driving said disks, each of said disks being drivably connected with said chain drive and being connected in turn with a separate drive motor.

5. Device as claimed in claim 1, wherein said disks are provided with external teeth meshing with each other and wherein one of said disks is drivably connected with the driving element of said machine.

6. Device as claimed in claim 1, wherein said disks are provided with external teeth meshing with each other and wherein one of said disks is drivably connected with a separate drive motor.

7. Device as claimed in claim 1 wherein said removal device is provided with at least one holder device for storing the assembled cups.

8. Device as claimed in claim 7 wherein the holder device of the removal device consists of at least one disk disposed opposite one of said disks of said removal device, said disk of said holder device being rotatably journaled, and tension wires disposed between said holder device.

* * * * *